Feb. 7, 1939.　　　J. R. RIPPE　　　2,146,193
VEHICLE BRAKE EQUALIZER
Filed March 11, 1935　　　4 Sheets-Sheet 1
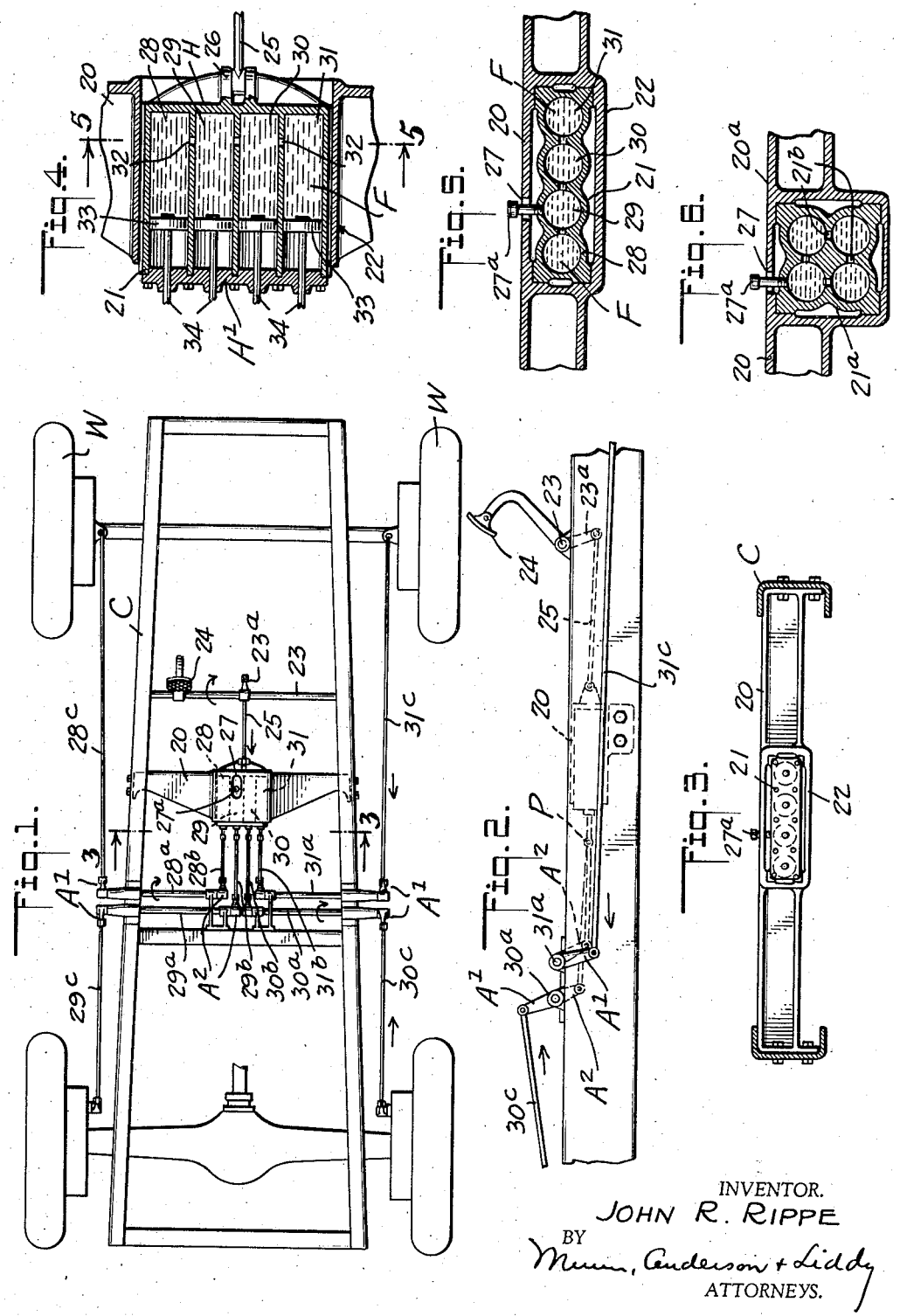
INVENTOR.
JOHN R. RIPPE
BY
Munn, Anderson + Liddy
ATTORNEYS.

Feb. 7, 1939.  J. R. RIPPE  2,146,193
VEHICLE BRAKE EQUALIZER
Filed March 11, 1935  4 Sheets-Sheet 2
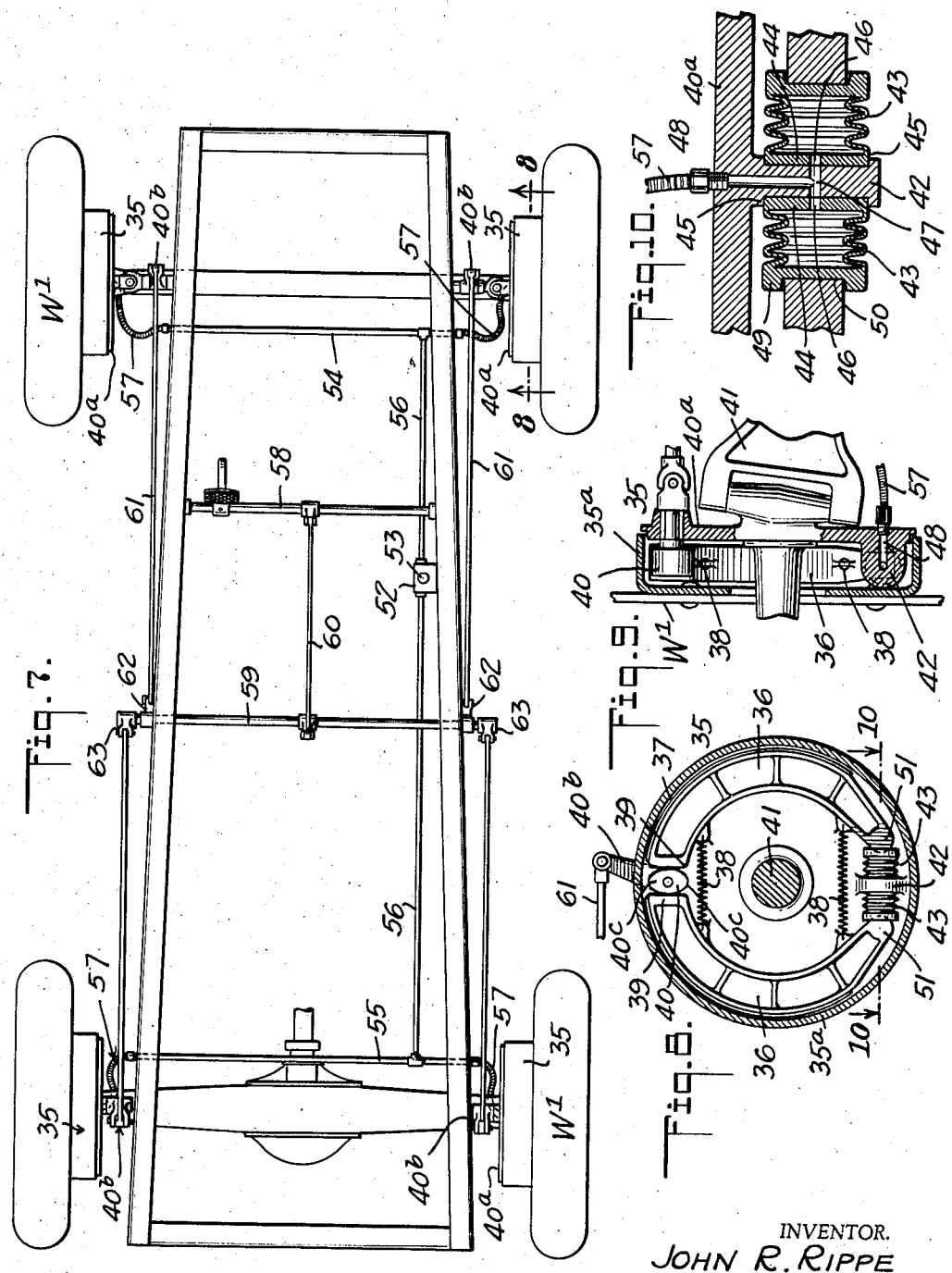
INVENTOR.
JOHN R. RIPPE
BY
ATTORNEYS.

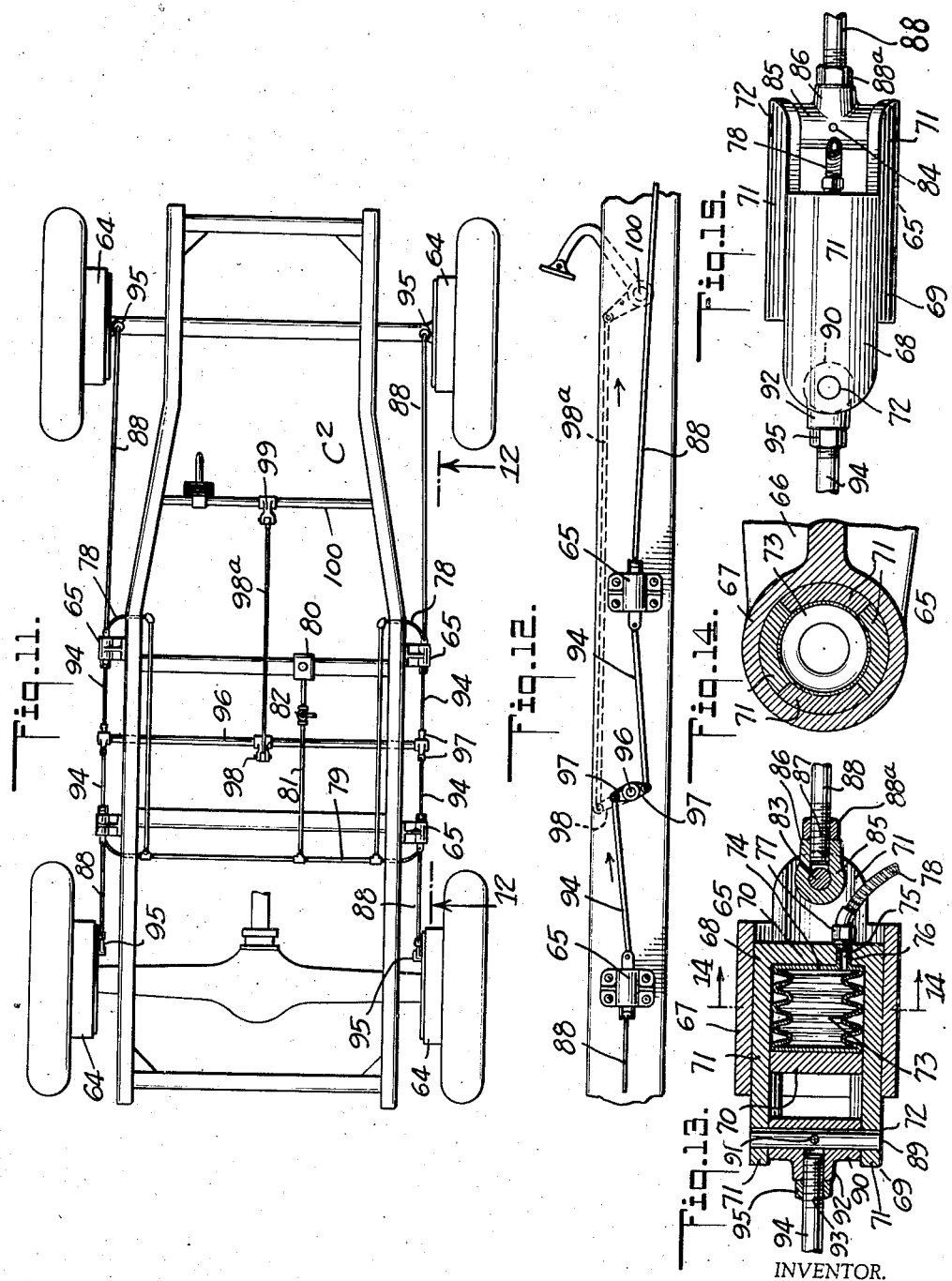

Feb. 7, 1939.  J. R. RIPPE  2,146,193
VEHICLE BRAKE EQUALIZER
Filed March 11, 1935  4 Sheets-Sheet 4

INVENTOR.
JOHN R. RIPPE
BY
Munn, Anderson & Liddy
ATTORNEYS.

Patented Feb. 7, 1939

2,146,193

UNITED STATES PATENT OFFICE 2,146,193

VEHICLE BRAKE EQUALIZER

John R. Rippe, Fresno, Calif.

Application March 11, 1935, Serial No. 10,568

13 Claims. (Cl. 188—2)

This invention relates to vehicle brakes.

It is an object of the invention to provide a brake equalizer which operates automatically upon occurrence of an excess pressure in any one or more of the brake linkages to transmit through a body of fluid, such as oil, a surplus of pressure in equally divided portions to respective fluid controlled means for each of the drums embodied in the system, thus to equalize the braking pressure in all the brake linkages and insure a positive and uniform application of the brakes.

An important feature of the invention is directed to the use, in a fluid controlled pressure equalizing system, of fluid containers which are devoid of valves, and which are designed and constructed to prevent leakage of fluid in the ordinary use of the invention.

A further object is to provide a fluid equalizer, in which means are employed to insure an operative application of the brakes even though all fluid in the fluid pressure chambers should be lost from the system or in the event of breakage or accidental disconnection occurring in the linkages.

A still further object is to provide novel positive acting means for rendering the pressure responsive mechanisms active upon the customary actuation of the brake pedal of an automotive vehicle.

With the above and other objects in view, the invention consists in the novel construction and combination of parts hereinafter described, illustrated in the accompanying drawings and set forth in the claims hereto appended, it being understood that various changes in the form, proportion, size and minor details of construction within the scope of the claims may be resorted to without departing from the spirit or sacrificing any of the advantages of the invention.

Referring to the drawings:

Figure 1 is a view in top plan of an automobile chassis equipped with conventional brakes and showing an application of the invention thereto;

Figure 2 is a view in side elevation of a portion of the chassis showing parts of the invention in full lines and parts in dotted lines;

Figure 3 is a transverse section taken on the line 3—3 of Figure 1;

Figure 4 is a horizontal section of the fluid containers and the hanger or supporting means therefor;

Figure 5 is a section taken on the line 5—5 of Figure 4;

Figure 6 is a view similar to Figure 5, showing a slightly different manner of assembling the fluid containers;

Figure 7 is a view similar to Figure 1, illustrating a modified form of the invention;

Figure 8 is a section taken on the line 8—8 of Figure 7;

Figure 9 is a vertical section through the parts shown in Figure 8;

Figure 10 is a section taken on the line 10—10 of Figure 8;

Figure 11 is a view similar to Figure 1, showing another form of the invention;

Figure 12 is a view in side elevation of a part of the structure shown in Figure 11, the view being indicated by the line 12—12 of Figure 11;

Figure 13 is a horizontal longitudinal section through one of the fluid container assemblies employed in the form shown in Figure 11;

Figure 14 is a section taken on the line 14—14 of Figure 13;

Figure 15 is a side elevation of the complementary sections of the bellows receiver;

Figure 16:
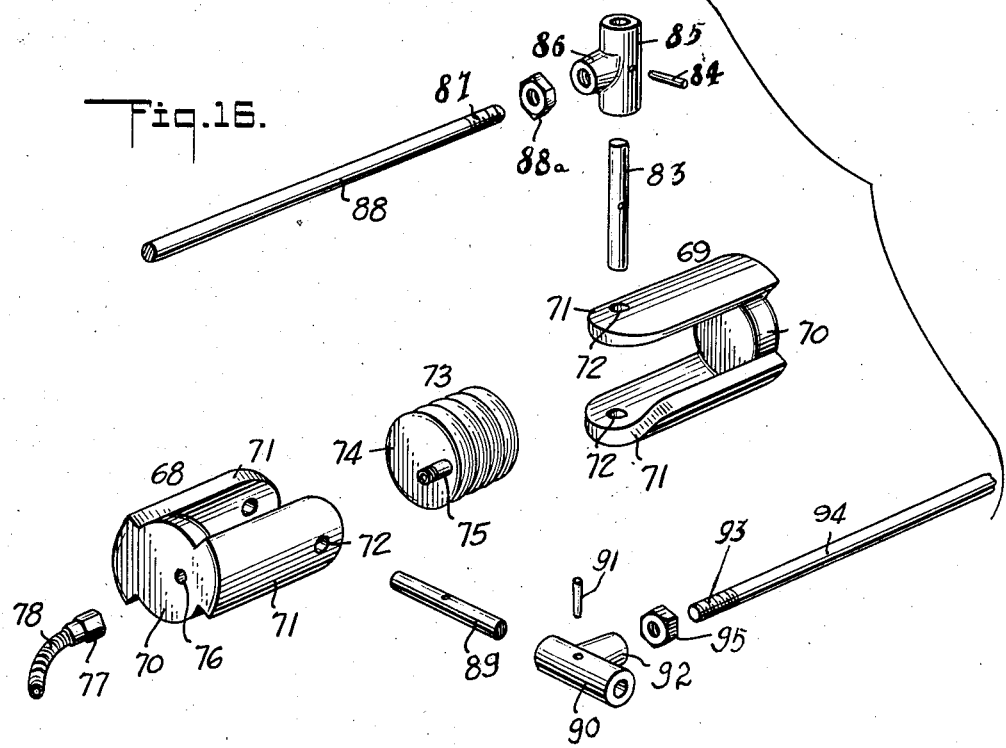
Figure 16 is a disassembled perspective view of certain of the parts of the bellows container.

Referring more particularly to the form of the invention shown in Figures 1–6, inclusive, a conventional form of automobile chassis C is employed. The chassis is provided with supporting wheels W, having brake mechanism, for example, of a type embodying brake drums fixed on said wheels and coacting brake shoes or other conventional friction means adapted to be actuated by individual reciprocable brake rods 28c, 29c, 30c and 31c.

Mounted transversely of the chassis C is a rigid support 20 having a guide 22 containing a horizontally reciprocable member or casting 21 in which cylinders 28, 29, 30 and 31 are formed. The cylinders are disposed with their axes parallel and extending longitudinally of the chassis. They can be disposed in one plane or layer, as shown in Fig. 5, or can be arranged in two planes or layers 21a communicating through ports 21b, as shown in Fig. 6, but operate similarly in either arrangement. The cylinders are all of the same length, and in the present embodiment are of like internal diameter and are closed at their front ends by a head H, formed as an integral part of the member 21. At their rear ends, said cylinders are closed and securely sealed against fluid leakage by a removable guide head H'. Rods 34 pass through the head H' and have operative connection at their forward ends with respective pistons 33 closely fitting the cylinders 31 and operating against a non-compressible fluid F in the cylinders. Fluid such as oil, glycerine or the like can be employed. The dividing walls between the cylinders are formed with ports 32, whereby constant communication is established between the cylinders to enable fluid in any of the cylinders to by-pass into the interconnected adjacent cylinders. Balancing of the pressures in said cylinders almost immediately follows the occurrence of an excessive pressure in any one of the cylinders. The guide 22 is formed with a longitudinal slot 27 passing a removable filling plug 27a, extending into the reciprocable member 21 so that the cylinders can be supplied with fluid.

Journaled to oscillate on the chassis C are rockshafts 28a, 29a, 30a and 31a, having equal length crank arms A² fixed thereto, to which the rear ends of respective links 28b, 29b, 30b and 31b are pivotally connected, the forward ends of said links having pivotal connection at P with their respective piston rods. Said shafts 28a, 29a, 30a and 31a are connected with the respective brakes of the supporting wheels W by means of the brake rods 28c, 29c, 30c and 31c, the inner ends of which have pivotal connection with fixed crank arms A' on the said rock shafts.

Mounted to oscillate on the chassis C is a rock shaft 23 having a crank arm 23a to which the forward end of a link 25 is pivotally connected. The rear end of the link is flexibly connected with the reciprocable member 21 by a hinge knuckle 26 (Fig. 4). The shaft 23 is provided with the usual form of foot actuated brake pedal 24.

When the brake pedal 24 is depressed, the shaft 23 is turned in a clockwise direction (Fig. 2) actuating the connecting link 25. The block 21 containing the cylinders is moved rearwardly and, through the liquid F contained in the cylinders, causes motion to be imparted to the pistons in a braking direction under the influence of a hydraulically uniform braking pressure. In response to rearward motion of the pistons 33, the links 28b, 29b, 30b and 31b are actuated to impart motion in a clockwise direction to the rock shafts 28a, 29a, 30a and 31a, thence to the brake rods 28c, 29c, 30c and 31c. The brakes are thus applied with uniform force at all wheels. The fixed piston actuated crank arms A² at the inner ends of the shafts 28a, 29a, 30a and 31a are of corresponding lengths, and the crank arms A' at the outer ends of said shafts are likewise of corresponding lengths and may be equal or in any selected length ratio according to the amount of force to be applied to the respective brake drums.

The fluid pressures in the respective piston cylinders are equalized, despite variations in the braking system, because the cylinders are in constant communication with each other through the by-pass ports 21b and 32. Should the pressure occurring at any one of the drums be excessive, or not the same as at others of the drums, the pressure difference is transmitted to the fluid by the piston corresponding to the particular brake drum, and fluid is appropriately by-passed from one unit or cylinder to the others to balance the pressures in the respective units or cylinders and thus insure equalization of braking force at all wheels of the vehicle.

In the form of the invention shown in Figures 7-10, inclusive, of the drawings, the wheels W' are each equipped with a brake 35 consisting of a drum 35a having internal shoes 36, each faced with lining 37 for frictional engagement, as customary, with the internal walls of said drum and normally released from engagement therewith by the retractile springs 38 connected to both of the shoes. Interposed between the faces 39 at the upper ends of the shoes is an oscillatory cam 40 by means of which the shoes can be moved against the normal actions of the springs 38, thus forcing the linings 37 in frictional engagement with the inner walls of said drum. The disk 40a or brake plate of the axle 41 constitutes a pivotal mounting for the cam 40 as is common practice in the art, and, as illustrated, said cam is mounted to move with a crank arm 40b.

Between the lower ends of the shoes 36 of each of the aforementioned brake drums and formed as an integral part of the fixed disk 40a of axle 41 is a lug 42 which enters the drum from the open side thereof. Interposed between the opposite flat faces of the lug 42 and the lower ends of said shoes are fluid actuated metallic bellows 43. Each of said bellows is formed with an inner head 44 seated in a complementary recess 45 in the adjacent face of said lug and has a port 46 in liquid-tight communication with the lateral branch 47 of a port 48 in said lug (Figure 10). Each bellows is also formed with an outer head 49, recessed or slightly cupped at 50 to receive the rounded cam-like nose 51 forming the lower end of the complementary shoe 36.

The fluid supply system employed in this form of the invention consists of a fluid holder 52 mounted at a suitable place on the chassis, as shown in Figure 7, and provided with a removable plug or closure 53 to enable it to be supplied with fluid. Cross pipes 54 and 55 are connected with the fluid holder by longitudinal branch pipes 56, and, as shown in Figure 7, the ends of said cross pipes 54 and 55 connect with the ports 48 in the respective lugs 42 of the fixed disks 40a through flexible tubing 57 so that constant intercommunication is established between the fluid holder 52 and all of the various bellows 43.

The brake pedal shaft 58 is operatively connected with a rock shaft 59 by a power transferring rod 60 in a manner similar to that aforementioned, and, as shown, the front wheel brakes have the crank arms 40b of their shoe actuating cams 40 pivotally connected to brake rods 61. The rods 61 are in turn pivoted to crank arms 62 fixed to said shaft 59. In like manner, the brake shoe actuating crank arms 40b for the rear wheel brakes are connected to the fixed crank arms 63 of said shaft 59.

For operation, the entire system, including the respective bellows 43, the holder 52 and its distributing pipes, is filled with fluid, and the plug 53 is securely closed. Depression of the pedal of shaft 58 concurrently transfers motion to the crank arms 40b to turn the cams 40 so that their lobes 40c are effectively advanced against the faces 39 of the shoes 36. The shoes 36 are thus effectively spread to cause the linings 37 to engage the inner walls of the brake drums. In consequence of this movement of the shoes 36, force is imposed upon the pressure responsive heads 49 of the bellows 43. Should more pressure tend to expend itself at one drum than the other, the fluid pressure will be instantly transferred to the bellows of all drums and the total pressure uniformly balanced and divided among them with a resulting uniform even application of said brakes. The principle embodied in this form of the invention is the same as that embodied in the first form. In each form there is the utilization in a fluid pressure system of surplus energy to effect equal distribution in all directions of equal pressures, as is made possible by constant intercommunication of the bellows 43 in Figures 7 to 10, inclusive, or the constant intercommunication between the fluid cylinders 31 in Figures 1 to 5, inclusive.

Figure 17:
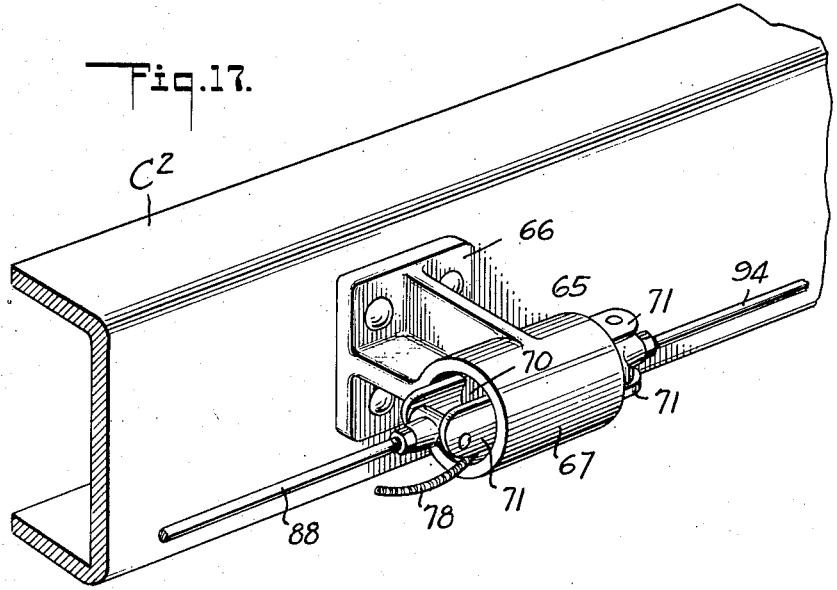
Figure 17 is a perspective view of a portion of one of the side bars of the chassis showing one of the bellows assemblies supported in operative position and rotated on its axis 90 degrees to the position indicated in the other views.

In the form of the invention shown in Figures 11 to 17, inclusive, of the accompanying drawings, the equalizer embodies the use of substantially conventional brakes 64 which may be of the type illustrated in detail in Figure 8. At the sides of the chassis C² are bellows assemblies 65, each consisting of a bracket 66 attached to the chassis as shown, and provided with a horizontal cylinder 67 in which the complementary relatively reciprocable elements 68 and 69 of a bellows container are mounted. These elements are similar in construction and each comprises a head 70 having side arms 71—71 apertured at their free ends as shown at 72. A metallic bellows 73 is disposed between the heads 70—70 to be slightly compressed thereby during relative approaching movement of said elements that enclose the bellows. The head 74 of the bellows is provided with a short pipe 75 which extends through a perforation 76 in the head 70 of element 68, and which is coupled at 77 to a flexible tube 78 forming part of a system of piping or flow lines 79, the later leading to a fluid holder 80 by way of a pipe 81, in which there is a valve 82. Fluid may be supplied to the holder in the same manner as referred to in the first described embodiments of the invention.

A pin 83 passes through the alined perforations 72 in the side arms 71 of element 69, and fixed to the pin by a key 84 is a sleeve 85 having a branch 86 in which is received the threaded end 87 of brake rod 88 clamped by a nut 88a. Passing through the alined perforations 72 in arm 71 of element 68 is a pin 89 to which a sleeve 90 is secured by a key 91, the sleeve having a branch 92 in which the threaded end 93 of rod 94 is firmly clamped by nut 95.

The bellows assemblies 65 are thus mounted in longitudinally alined pairs at the opposite sides of the chassis and the brake rods 88 of the forwardly disposed ones of said bellows are connected with the cam controlling levers 95 of the front brake drums. The rods of the rearwardly disposed assemblies connect in like manner with the cam controlling arms 95 of the rear brake drums.

Journaled in the chassis C² is a transverse rock shaft 96 having its ends provided with oppositely extending fixed equal length crank arms 97 having pivotal connection with the respective power transferring rods 94. The shaft 96 has a crank arm 98 which connects through links 98a with the crank arm 99 on the brake pedal shaft 100.

When the complementary elements 68 and 69 are interfitted as proposed and intended, they can slide relatively in a longitudinal direction and the arms 71 of one element will be disposed between the arms 71 of the other element, the plurality of arms defining a cylindrical expansible and contractible container for said bellows 73. The heads 70 of the coacting elements 68 and 69 will be disposed in parallel relation to each other and in flat contact with the respective heads of said bellows, thus insuring even expansion and contraction of the bellows in response to force imparted thereto.

With the system filled with oil, and the valve 82 closed, depression of the pedal on the shaft 100 imparts motion to the shaft 96 which is transferred to the rods 94 from the levers 97, thus exerting a forward bellows compressing pull on the rods 94 of the rear bellows assemblies and a rearward bellows compressing pull on the rods 94 leading to the front assemblies. Braking force is equally transmitted to the brake drums through the liquid in the respective bellows, since the respective bellows are in direct communication with each other through the flow lines 79. Should an excess of pressure occur in any one bellows, the surplus of pressure will pass to the other bellows of the set and the braking pressures made equal at each brake drum.

The diameter of each piston, or the diameter of the metallic bellows, will be proportioned to the effective braking pressure to be utilized at the respective drums. Depending upon the braking effect to be obtained in any specific instance, the sizes of the pistons or the sizes of the bellows may be altered to produce a greater or lesser braking action at the rear wheels than would be required at the front wheels.

In Figures 7 and 11 the forms of the invention therein illustrated are each provided with a single rotative shaft having four equal length crank arms, whereas in the form shown in Figure 1, four rotative shafts are employed, each having fixed thereto a single crank arm.

In the form of the invention shown in Figures 1 to 6, inclusive, the throw of the block or cylinder casting 21 enables the pistons to abut against the head H thereof during movement of the casting in a braking direction in the event that the fluid should be lost from said cylinders, and in like manner abut against the head H' during movement of said casting in a brake releasing direction. Should any one of the brake rods 28c, 29c, 30c or 31c become broken or disconnected from its coacting pressure means, the other pressure means for the remaining drums may still be effectively operated, a feature which is highly important as a safety factor. Assuming that fluid has not been entirely lost from the cylinders and that the linkages between one piston and its brake have been damaged or disconnected, said piston will be forced back against the head H' by the pressure of the liquid against said piston, the fluid in the remaining cylinders continuing to function as first stated.

In the form shown in Figures 7 to 10, inclusive, should the metallic bellows 43 become devoid of fluid, they can fully collapse and function as solid stops between the shoe ends 51 and adjacent faces of the lugs 42. The movements of the cams 40 are ample to enable the brakes to be applied even when the bellows are fully collapsed. But, assuming that the fluid in all cylinders is at least partly normal, one of the linkages between shaft 59 and one of the brake drums can be disconnected, and fluid pressure will still be effective to apply the disabled brake. Instead of the force being transmitted to the shoes of said brake through the cam 40, the cam merely functions as a stop or bearing between the ends 39 of said shoes and the shoes are actuated directly by expansion of the fluid in the bellows 43 at the opposite ends of said shoes. The oil or liquid in the bellows of the brakes, the linkages of which are intact, will be compressed and thus pressure is set up in the fluid line of the system and utilized to expand the bellows in the disabled brakes. It thus follows that the brake in the wheel of the disabled linkage will be applied against the cam 40, which in this case merely acts as a stop.

The action of the parts shown in Figures 11 to 17, inclusive, is substantially like that described in the form shown in Figures 7 to 11, inclusive, in the event of (1) fluid leakage, or (2) a disconnected or damaged power transmitting connection between shaft 96 and a particular brake.

I claim:

1. The combination with a mechanical brake system of the type employing a plurality of brake drum mechanisms each having a pair of expansible friction devices and means for spreading said devices to establish braking contact thereof with the drums; of fluid equalizers interposed between said pair of friction devices and compressible in response to an excess of braking effect set up in said pair of devices, and said equalizers being in constant communication with each other so that upon an occurrence of said excess effect same will be equally apportioned among all of the equalizers with a resultant balancing of unit pressures therein.

2. The combination with a mechanical brake system of the type employing a plurality of brake drum mechanisms each having expansible friction devices and means for actuating said devices to establish braking contact thereof with the drums; of fluid equalizers coacting with said friction devices in response to an excess of braking effect set up in any one thereof, and said equalizers being in constant communication with each other so that upon an occurrence of said excess effect same will be equally apportioned among all of the equalizers with a resulting balancing of unit pressures therein; the friction devices for each of the aforementioned drums comprising co-operable shoes, and said equalizers including a fluid bellows interposed between the shoes to be actuated by said shoes to effect said balancing of the fluid pressure.

3. In a brake equalizer, a brake drum having pressure shoes for frictional engagement with the walls thereof, brake pedal controlled means for moving the shoes in a braking direction; a brake plate mounting, and a pair of flexible pressure equalizing fluid containers interposed between the shoes to impose a load on the fluid in response to the braking effect of the shoes when the shoes have been moved in the aforestated braking direction.

4. In a brake equalizer, a brake drum having pressure shoes for frictional engagement with the walls thereof, brake pedal controlled means for moving the shoes in a braking direction; a brake plate mounting, and a pair of flexible pressure equalizing fluid containers interposed between the shoes to impose a load on the fluid in response to the braking effect of the shoes when the shoes have been moved in the aforestated braking direction; and means establishing communication between the containers and an external fluid flow line.

5. In a brake equalizer, a brake drum having pressure shoes for frictional engagement with the walls thereof, brake pedal controlled means for moving the shoes in a braking direction; a brake plate mounting, and a pair of flexible pressure equalizing fluid containers interposed between the shoes to impose a load on the fluid in response to the braking effect of the shoes when the shoes have been moved in the aforestated braking direction; and means establishing communication between the containers and an external fluid flow line and comprising means on the brake plate having ports opening to said containers.

6. In a vehicle brake mechanism, a drum having pressure exerting means movable from a released position to a position to impose braking pressure on the drum; a disc having fixed ported means extending into the drum; a fluid bellows interposed between said pressure-exerting means and the ported means and communicating with the port thereof and said bellows being sensitive to circumferential and radial loads imposed thereupon by the pressure exerting means, whereby to transmit the force of the loads to the fluid in said bellows.

7. A vehicle brake comprising a brake drum, a pair of brake shoes within said drum, a pair of expanding means disposed each between adjacent ends of said brake shoes and forming the sole means for restraining rotation of said brake shoes with said drum, means for urging said brake shoes toward each other, means for mechanically operating one of said expanding means, and means included in the other expanding means for hydraulically resisting the operation of said one of said expanding means.

8. A vehicle brake comprising a brake drum, a substantially rigid brake shoe within said drum, means at one end of said brake shoe for forcing said shoe against said drum, means at the other end of said brake shoe for forcing said shoe against said drum, said forcing means being the sole means for restraining rotation of said shoe with said drum, means for mechanically operating one of said forcing means, means included in the other forcing means for hydraulically resisting the operation of said one of said forcing means, and spring means for urging said brake shoe bodily against both of said forcing means.

9. A vehicle brake comprising a brake drum, a rigid, approximately semi-circular brake shoe within said drum, a hydraulically supported yieldable chamber abutting one end of said brake shoe, a mechanically operable cam abutting the other end of said brake shoe, and yielding means for urging said brake shoe to be supported against rotation solely by said chamber and said cam.

10. A vehicle brake comprising a brake drum, a pair of rigid, approximately semi-circular brake shoes within said drum and free to move bodily therewith, a hydraulically supported yieldable chamber disposed between adjacent ends of said pair of brake shoes for preventing circumferential rotation of said shoes, and means between the other adjacent ends of said pair of brake shoes for preventing circumferential rotation of said shoes but permitting substantial bodily movement of each of said shoes radially toward said yieldable chamber.

11. A brake mechanism comprising a drum, a substantially rigid arcuate shoe movable into frictional engagement with the internal surface thereof, a circumferentially and radially yieldable hydraulically supported chamber abutting one end of said shoe, and means acting against the opposite end of said shoe for carrying the same into frictional engagement with said drum.

12. A brake mechanism comprising a drum, movable brake actuating and equalizing members within said drum, and an arcuate brake shoe supported against rotation within said drum solely by having its ends urged into free contact with said members.

13. A brake mechanism comprising a drum, a pair of movable abutments within said drum, and an arcuate brake shoe supported against rotation solely by having its ends urged into free contact with said abutments respectively and movable by either or both thereof into frictional engagement with said drum.

JOHN R. RIPPE.